April 15, 1941.    A. Y. DODGE    2,238,310
TRANSMISSION
Filed Aug. 27, 1938    3 Sheets-Sheet 1

INVENTOR.
ADIEL Y. DODGE
BY McConkey Dawson & Booth
ATTORNEYS.

April 15, 1941.  A. Y. DODGE  2,238,310
TRANSMISSION
Filed Aug. 27, 1938   3 Sheets-Sheet 3

INVENTOR.
ADIEL Y. DODGE
BY McConkey Dawson & Booth
ATTORNEYS.

Patented Apr. 15, 1941

2,238,310

UNITED STATES PATENT OFFICE 2,238,310

TRANSMISSION

Adiel Y. Dodge, Rockford, Ill.

Application August 27, 1938, Serial No. 227,137

3 Claims. (Cl. 74—262)

This invention relates to transmissions and more particularly to transmissions having selectively operable controlling means.

One of the objects of the invention is to provide a transmission having controllable means for varying the operating ratio in which the desired ratio can be selected and the necessary changes in setting can be made semi-automatically. Preferably the changes in setting are effected by operating a conventional clutch pedal or a similarly manually operated member.

Another object of the invention is to provide a transmission including a hydraulic torque converter and a gear set in which changes in the gear set are made by operating brake members to vary the operating range of the transmission.

Another object of the invention is to provide control means for a transmission in which the desired changes may be preselected or may be selected during operation of the control means to change the setting of the transmission. The selection is preferably effected by a rotatable cam which may be set at any desired time either before or during the pedal operation.

Another object is to provide shifting means suitable for shifting tooth clutches, or friction clutches, gears or the like.

Other objects and advantages of the invention including novel subcombinations and desirable structural arrangements may be apparent from the following description when read in connection with the accompanying drawings in which.

Figure 1:
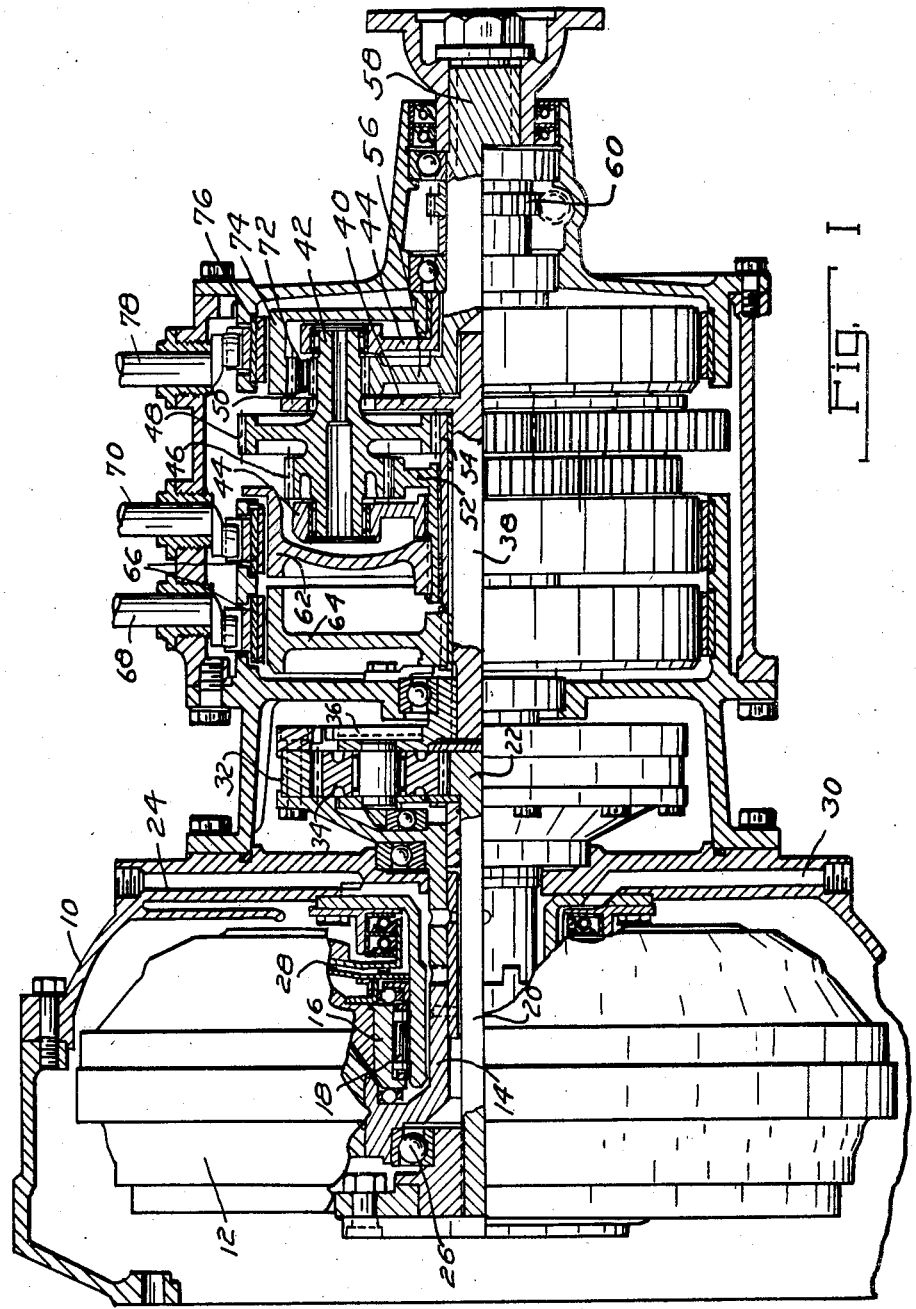
Figure 1 is a section with parts in plan of a transmission controllable in accordance with the present invention.

The transmission illustrated in Figure 1 includes a fixed housing 10 in which there is mounted a hydraulic torque converter 12 of the type more particularly described and claimed in my copending application Ser. No. 57,520 filed January 4, 1936. The torque converter 12 includes an outer impeller housing connected to a source of power such as the crank shaft of an internal combustion engine and having within the housing a rotor mounted on the sleeve 14 and a stator or reaction member carried by a hub 16 which is held against rotation in the reverse direction by a combined one-way clutch and bearing 18. A shaft 20 forming an extension of the driving shaft extends through the sleeve 14 and terminates in a sun gear 22.

Liquid is supplied to the torque converter through a passage 24 communicating with the interior of the sleeve 14. From the sleeve 14 the liquid flows past a bearing 26 into the hydraulic circuit defined by the impeller, the rotor and the stator. Radial passage 28 in the impeller housing forms a liquid outlet from the transmission and communicates with a passage 30 in the case 10 which conducts the liquid to a suitable cooler or the like from which it may be recirculated through the torque converter. The sun gear 22 forms one element of a planetary gear set including a ring gear 32 connected to the sleeve 14 and a plurality of planet pinions 34 mounted on a carrier 36 which is secured to a shaft 38. The shaft 38 has a flange 40 rotatably connected to a shaft 42 which is mounted in rings 44 for planetary movement around the shaft 38. The shaft 42 is formed with a series of pinions 46, 48 and 50 of different sizes and which mesh respectively with gears 52, 54 and 56. The gear 56 is connected to a driven shaft 58 which is the output shaft of the transmission and which is illustrated as carrying a suitable speedometer gear 60 for indicating the driven speed.

A pair of brake drums 62 and 64 are connected respectively to the gears 52 and 54 and are adapted to be engaged by brake bands 66 to be held stationary when desired. The brake bands 66 are operated by rotatable shafts 68 and 70.

The pinion 50 meshes with a second pinion 72 which in turn meshes with an internal gear 74 having a brake band 76 operated by a shaft 78 to hold it stationary when desired.

Parts 40 and 44 are secured together by spacers lying between the planet gears, to form a planet cage.

In operation of the transmission as so far desired when the shaft 70 is turned to brake the drum 62 and hold the gear 52 stationary, the transmission is in low range position. At this time the sun gear 22 will be driven from the engine shaft and the ring gear 32 will be driven by the rotor of the hydraulic torque converter to turn the planet cage 36 and the shaft 38 jointly. This causes the shaft 42 to planetate and to rotate about its own axis due to rolling of the pinion 46 on the stationary gear 52. Since the pinions 46 and 50 and gears 52 and 56 are of different sizes, the gear 56 and the driven shaft 58 will be turned at a speed less than the speed of shaft 38 and at a correspondingly higher torque. If the brake drum 62 is released and the drum 64 is braked the gear 54 will be held stationary. Since the gear 54 is smaller than gear 52 and gear 48 is correspondingly larger than gear 46 and the driven shaft 48 will be turned at a higher rate of speed.

In order to obtain reverse both brake drums 62 and 64 are released and brake 76 is operated to engage the ring gear 74. With this ring gear stationary the direction of rotation of shaft 42 will be reversed due to the intermediate pinion 72 so that gear 56 and driven shaft 48 will be rotated backwards.

When all three brake drums 62, 64 and 76 are released a neutral or free position is had.

Figure 2:
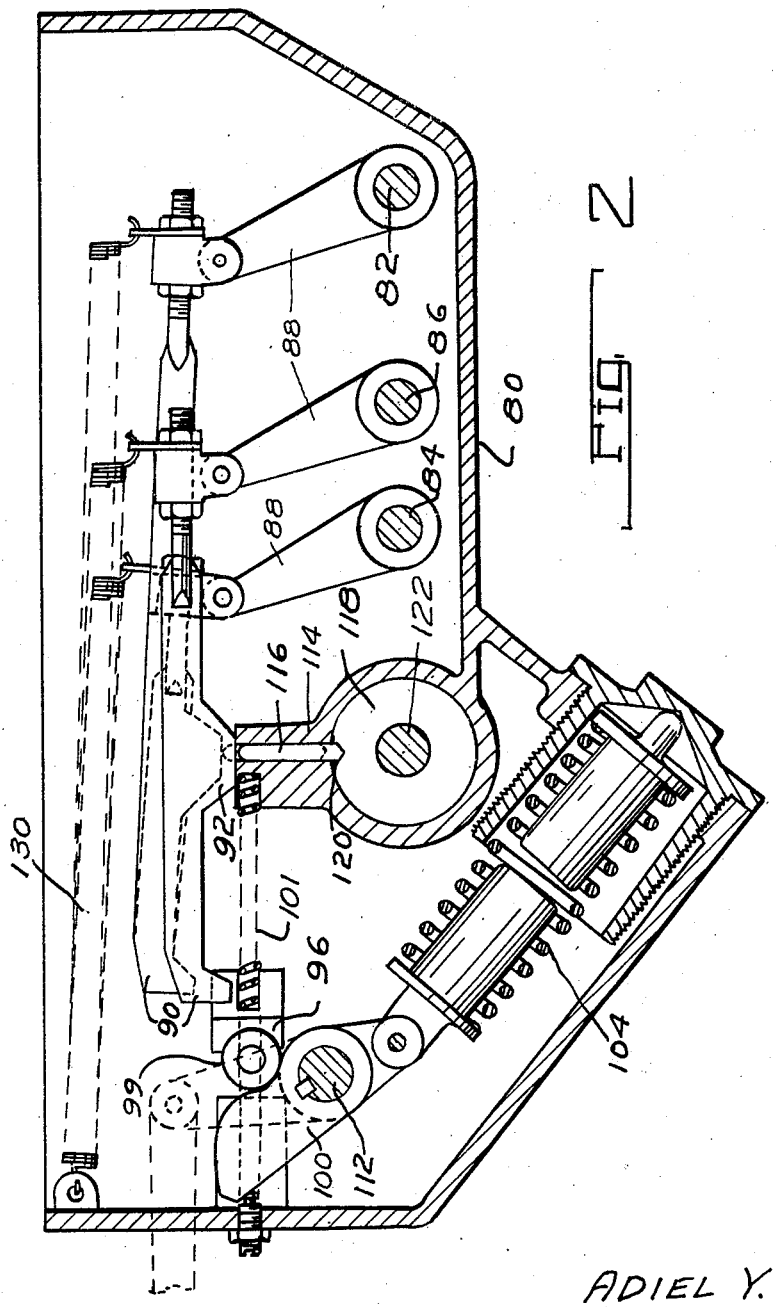
Figure 2 is a vertical section with parts in elevation of a control mechanism according to the invention.

Figure 2 shows one control arrangement for operating the clutch shafts 68, 70 and 78. While this mechanism is described particularly for the control of these shafts, it will be understood that it might be employed equally well to control various other types of transmissions such as differential and planeting gear transmissions.

The control mechanism of Figure 2 includes a casing 80 adapted to be mounted beside a transmission to be controlled and having mounted therein three shafts 82, 84 and 86 connected respectively to the shafts 78, 68 and 70. Each shaft carries a lever arm 88 having pivotally connected at its free end to a shifter bar 90 formed with a cam portion along its under edge at 92 and having at its end a nose or finger projection 94 adapted to engage a shifting member 96 reciprocably mounted in suitable guides 98.

The member 96 carries a roller 99 adapted to engage a cam lever 100 pivoted on a shaft 112 which may be the conventional clutch shaft but which is preferably operated by means of a pedal similar to the conventional clutch pedal. When the pedal is depressed the lever 100 is rocked counterclockwise to the position shown and the member 96 is caused to follow it by a spring 101. When the pedal is released the lever 100 is rocked clockwise to cam the member 96 to the right by a spring 104 which acts against the lower end of the lever. At this time the member 96 will move to the right any one of the bars 90 which is in engagement with it to rock the corresponding shaft.

Engagement of the shifter bars 90 with the member 96 is controlled by a series of pins or plungers 116 slidable in a stationary guide 114 and registering respectively with the bars. The plungers 116 are controlled by a cylindrical cam 118 formed with notches 120 to register with different ones of the plungers in different positions of the cam. The cam is carried by a shaft 122 which may be connected to suitable control means, not shown, for convenient access to an operator. The bars 90 are urged downwardly into engagement with the plungers 116 and to the left by suitable springs 130 connected to projecting lugs on the bars.

In operation the cam may be set to a preselected position prior to depressing the pedal which rocks shaft 112 or may, if desired be set after the pedal has been depressed since the only pressure on the plungers 116 is the light downward force exerted by the idle shifter bars. In the position shown the pedal has been depressed and the cam has been turned to drop the plunger 116 which engages the bar 90 connected to the arm 88 on shaft 86. The other plungers are, at this time, out of register with notches 120 so that the other bars 90 are raised.

When the pedal is released the member 96 will be moved to the right by the cam lever 100 and will engage the lowered bar 90 to shift it to the right. This will rock shaft 86 and its connected shaft 70 to engage the brake on drum 62. To control the other brakes the cam may be turned to different positions upon subsequent operations of the pedal to shift the other bars.

Figure 3:
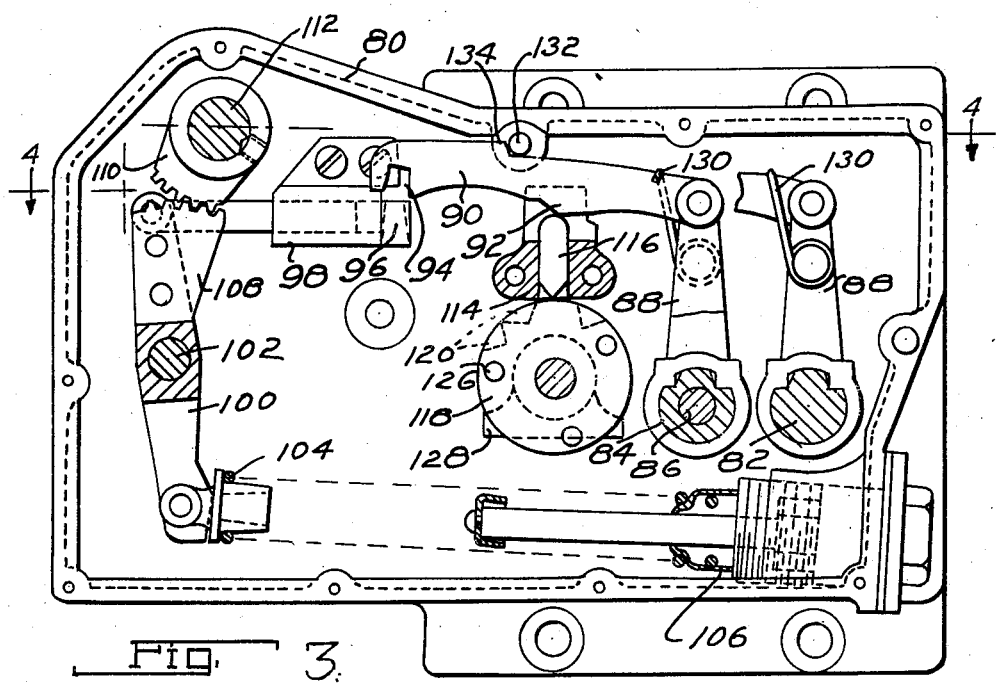
Figure 3 is a section similar to Figure 2 of a modified construction.
Figure 4:
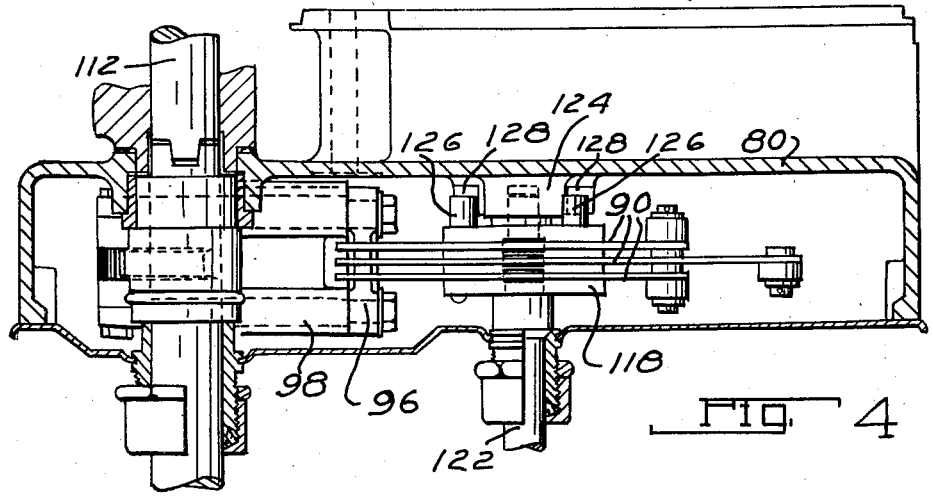
Figure 4 is a section on the line 4—4 of Figure 3.

In the modified construction of Figures 3 and 4 parts corresponding to like parts in Figure 2 have been designated by the same reference numerals for the sake of brevity of description. In this construction the shafts 84 and 86 are arranged concentrically and the shifter bars are formed with notches 94 in their ends to fit over a suitably shaped projection on the shifting member 96. The cam lever is replaced by a yoke 100 connected to the member 96 and urged in one direction by the spring 104 which is seated against an adjustable cap 106.

The yoke 100 carries a gear segment 108 meshing with a segment 110 mounted on the shaft 112. When the pedal is depressed, the segment 110 is rocked clockwise to the position shown to move the shift member 96 to the left. Upon release of the pedal, the spring 104 moves the shifting member 96 to the right and with it moves any one of the shifter bars 90 which is engaged therewith.

In order to control the shifter bars, a stationary guide 114 is provided having slidably mounted therein a series of blocks 116 registering respectively with the shifter bars. The blocks 116 are controlled by a rotatable cylindrical cam 118 having a series of notches 120 therein to receive the ends of the blocks. The cam 118 is carried by a shaft 122 journaled in the casing 80 and having its end journaled in a projection 124 secured to the side of the casing. Pinions 126 carried by the cam are adapted to engage stop projections 128 to limit rotation of the cam. The shaft 122 is provided with suitable controlled means not shown which may be arranged for convenient access to an operator.

In operation of this embodiment the cam may be set to a preselected position prior to actuation of the pedal which turns shaft 112 or may, if desired, be set after depressing the pedal since the only pressure on the cam is the downward force exerted by the idle shifter bars 90. Preferably the shifter bars 90 are urged against the blocks 116 by suitable coil springs 130. As shown in Figure 3, the cam is in neutral position in which all of the notches 120 are out of register with the blocks 116 and all of the blocks 116 are consequently in their raised position. In this position the cam portions 92 engage the blocks 116 and raise the shifter bars so that the notches 94 are out of engagement with the shifting member. In order to prevent accidental rise of a shifter bar when engaged with 96 a stationary pin 132 is preferably provided engaging upper edge or bar 90 to the left of shoulders 134. If the cam 118 is turned to bring one of the notches 120 into register with the coresponding block 116, the block will drop down permitting the corresponding shifter bar 90 to drop down so that its notch 94 ordinarily fits over the shifting member 96. If the pedal is released with the parts in this position, the shifter bar which engages the shifting member will be moved to the right to rotate its shaft thereby to effect the desired shifting operation.

Due to the light load on the cam 118, it will be apparent that the cam may easily be turned at any time either prior to or subsequent to actuation of the pedal, any bar 90 which is engaged with 96 and is to the right in its operating position is so shaped on its under edge that the block 116 may be raised without contacting 90. Upon the next depression of the pedal said bar will travel to the left and eventually come in contact with block 116 if raised. This occurs after the load between 96 and 90 is reduced to nil. Any bar 90 which has been dropped prior to 96 moving left will contact 96 at the lower concave edge at some position to the right of 94 but when 96 reaches its left position slot 94 will snap into engagement with 96. On the next actuation of the pedal, the shifter bar will be moved back to the left to the position shown.

Occasionally it is desirable to shift one member forward and another member aft with the same control shaft as is the case in slide gear transmissions and in transmissions employing tooth clutches.

In order that this may be accomplished by the means shown, I have telescoped shifts 86 and 84 in Figures 3 and 4 so that they have the same centers. In this way they may be arranged in relation to other parts quite as though they were one shaft.

In this way a control is provided suitable to operate a two forward speed and a reverse gear box. It is apparent that two shafts may be used at 82 similarly to that shown at 84 merely necessitating four levers and four shift members, etc. instead of three. Such an arrangement will control a three speed and reverse gear box.

In the way of further explanation, if the shift rails of a standard gear box are placed on the side instead of the top, which has been done, then it becomes necessary only to provide suitable linkage so that the turning of such shafts as 84 and 86 will cause the rails to shift to and from neutral to the fore and aft positions desired. It is thought unnecessary to show either the conventional gear box or the connecting linkage thereto.

While several embodiments of the invention have been shown and described in detail, it will be understood that numerous changes might be made therein and it is not intended to limit the scope of the invention to the exact forms shown nor otherwise than by the terms of the appended claims.

What is claimed is:

1. In a transmission having controllable means to vary the driving ratio, control mechanism comprising a plurality of shifter bars connected adjacent one end to said controllable means, a shifting member engageable with the other ends of said bars to move them lengthwise, said bars having cam portions intermediate their ends, and control members engageable with said cam portions selectively to control engagement of the bars with the shifting member, said bars being so shaped adjacent the cam portions that they will remain in engagement with the shifting member except when the cam portions engage the control members.

2. A transmission control device comprising a plurality of shifter bars mounted for lengthwise and pivotal movement, a shifting member engageable with said bars to move them lengthwise, said bars having raised cam portions intermediate their ends, and selector members engageable with said cam portions to move the bars pivotally out of engagement with the shifting member, said bars being so shaped adjacent the cam portions that they will remain in engagement with the shifting member except when the cam portions engage the selector members.

3. A transmission control device comprising a plurality of control shafts, a lever secured to each of said shafts, shifter bars pivotally connected to said levers, a shifting member reciprocable substantially in alinement with said bars and engageable with the bars to move them lengthwise into and out of a neutral position, a plurality of blocks engageable with said bars respectively to move them away from the shifting member, and a selector cam to control said blocks, said bars being so shaped that they will remain in engagement with the shifting member except when engaged by said blocks in substantially the neutral position of the bars.

ADIEL Y. DODGE.